US009767735B2

(12) United States Patent
Mizukami et al.

(10) Patent No.: US 9,767,735 B2
(45) Date of Patent: Sep. 19, 2017

(54) TERMINAL DEVICE AND ILLUMINATION CONTROL METHOD

(71) Applicant: Sony Corporation, Tokyo (JP)

(72) Inventors: Tomoo Mizukami, Tokyo (JP); Eri Watanabe, Kanagawa (JP); Yoshiyuki Kobayashi, Kanagawa (JP)

(73) Assignees: Sony Corporation, Tokyo (JP); Sony Mobile Communications Inc., Tokyo (JP)

( * ) Notice: Subject to any disclaimer, the term of this patent is extended or adjusted under 35 U.S.C. 154(b) by 217 days.

(21) Appl. No.: 14/341,150

(22) Filed: Jul. 25, 2014

(65) Prior Publication Data

US 2016/0027386 A1 Jan. 28, 2016

(51) Int. Cl.
| | |
|---|---|
| *G09G 3/36* | (2006.01) |
| *G09G 3/34* | (2006.01) |
| *G06F 3/0346* | (2013.01) |
| *G06F 1/32* | (2006.01) |
| *G06F 3/01* | (2006.01) |
| *G06F 1/16* | (2006.01) |
| *H04W 52/02* | (2009.01) |

(52) U.S. Cl.
CPC ......... *G09G 3/3406* (2013.01); *G06F 1/1694* (2013.01); *G06F 1/3231* (2013.01); *G06F 1/3265* (2013.01); *G06F 3/017* (2013.01); *G06F 3/0346* (2013.01); *H04W 52/027* (2013.01); *H04W 52/0254* (2013.01); *G09G 2320/064* (2013.01); *G09G 2330/022* (2013.01); *G09G 2354/00* (2013.01); *H04M 2250/12* (2013.01); *Y02B 60/1242* (2013.01); *Y02B 60/1289* (2013.01); *Y02B 60/50* (2013.01)

(58) Field of Classification Search
CPC .......................................... G09G 3/34–3/3406
See application file for complete search history.

(56) References Cited

U.S. PATENT DOCUMENTS

| | | | | |
|---|---|---|---|---|
| 5,712,662 | A * | 1/1998 | Miyazaki et al. | 345/173 |
| 5,742,264 | A * | 4/1998 | Inagaki et al. | 345/8 |
| 8,487,918 | B1 * | 7/2013 | Nelissen et al. | 345/204 |
| 2007/0075965 | A1* | 4/2007 | Huppi et al. | 345/156 |
| 2009/0143108 | A1* | 6/2009 | Chiba | 455/566 |
| 2009/0160541 | A1* | 6/2009 | Liu et al. | 327/544 |

FOREIGN PATENT DOCUMENTS

JP 2012-171485 A 9/2012

OTHER PUBLICATIONS

Joana Raquel Cerqueira da Silva ( Smartphone Based Human Activity Prediction , Jul. 23, 2013, Faculdade De Engenharia Da Universidade Do Porto).*

* cited by examiner

*Primary Examiner* — Hang Lin
(74) *Attorney, Agent, or Firm* — Oblon, McClelland, Maier & Neustadt, L.L.P.

(57) ABSTRACT

To avoid unintentionally turning off a backlight, a device includes circuitry that is configured to control a backlight to illuminate a display panel of the device; store a first preset time interval for reducing brightness of the backlight; determine that an input has not been received within the first preset time interval; acquire one or more signals from a sensor device corresponding to movement of the device; estimate whether the device is in use based on the one or more signals; and postpone a reduction in the brightness of the backlight based when a result of an estimate indicates that the device is in use.

19 Claims, 9 Drawing Sheets

FIG. 9

| Primary Process | Secondary Process | Tertiary Process | Obtained feature |
|---|---|---|---|
| ax, ay, az | NOP<br>Diff | Mean | Orientation of terminal device, and direction of change of acceleration:<br>    Angle of terminal device and direction of change of acceleration are likely different between the time when the terminal device is being used and the time when the terminal device is not being used.<br>For example:<br>  • When not being used, the terminal device will be in a horizontal state when lying on a desk.<br>  • When being placed into a bag, the terminal device will be at an orientation angle that is unlikely for a terminal device that is in use.<br>  • When not being used, the acceleration of the terminal device will change in a direction in which the acceleration is unlikely to change when the user touches the screen or the operation key on the terminal. |
| ax, ay, az,<br>norm | NOP<br>Diff<br>LPF | StDev | Variance of change in acceleration and the like of terminal device:<br>    When the terminal device is being used, the change in acceleration will become great; when the terminal device is not being used, the change in acceleration will become small. |
| ax, ay, az,<br>norm | NOP<br>Diff<br>LPF | Skewness<br>Kurtosis | Kurtosis and skewness of the distribution of the acceleration of the terminal device:<br>    When the terminal device is being used, the distribution of the acceleration may deviate from Gaussian distribution due to operations performed by the user.<br>    When the terminal device is not being used, sensor noise and shake caused by disturbances are observed, wherein the sensor noise and the shake are both close to Gaussian distribution. |

TERMINAL DEVICE AND ILLUMINATION CONTROL METHOD

BACKGROUND

Technical Field

The present disclosure relates to backlight illumination control on a terminal device and related control processing based on sensor inputs.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present disclosure.

Terminal devices such as Smart Phones are generally equipped with a function to dim or extinguish a backlight which illuminates a Liquid Crystal Display (LCD) stacked on a touchscreen after a predetermined period of time has passed since a user's finger has touched the touchscreen. However, the user may still be using the terminal device for a function that does not require touching the touchscreen, such as reading, and prematurely extinguishing the backlight may an inconvenience to the user. In addition, electric power may be wastefully consumed during the predetermined period of time that the backlight remains illuminated.

SUMMARY

A device and method for controlling backlight illumination on a terminal device are discussed herein.

According to one exemplary embodiment, the disclosure is directed to a device including: circuitry configured to control a backlight to illuminate a display panel of the device; store a first preset time interval for reducing brightness of the backlight; determine that an input has not been received within the first preset time interval; acquire one or more signals from a sensor device corresponding to movement of the device; estimate whether the device is in use based on the one or more signals; and postpone a reduction in the brightness of the backlight based when a result of an estimate indicates that the device is in use.

According to another exemplary embodiment, the disclosure is directed to a method of controlling illumination of a device including: controlling a backlight to illuminate a display panel of the device; storing a first preset time interval for reducing brightness of the backlight; determining that an input has not been received within the first preset time interval; acquiring one or more signals from a sensor device corresponding to movement of the device; estimating whether the device is in use based on the one or more signals; and postponing a reduction in the brightness of the backlight based when a result of the estimate indicates that the device is in use.

According to another exemplary embodiment, the disclosure is directed to a non-transitory computer readable medium having instructions stored therein that, when executed by one or more processors, cause the one or more processors to perform a method of controlling illumination of a device, wherein the device includes a motion sensor, the method including: controlling a backlight to illuminate a display panel of the device; storing a first preset time interval for reducing brightness of the backlight; determining that an input has not been received within the first preset time interval; acquiring one or more signals from a sensor device corresponding to movement of the device; estimating whether the device is in use based on the one or more signals; and postponing a reduction in the brightness of the backlight based when a result of the estimate indicates that the device is in use.

The foregoing general description of the illustrative implementations and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein:

FIG. 9 is an exemplary table describing how feature values of the terminal device are obtained from primary, secondary, and tertiary processes and how they relate to determining use or non-use of the terminal device according to certain embodiments.

DETAILED DESCRIPTION

Figure 1A:
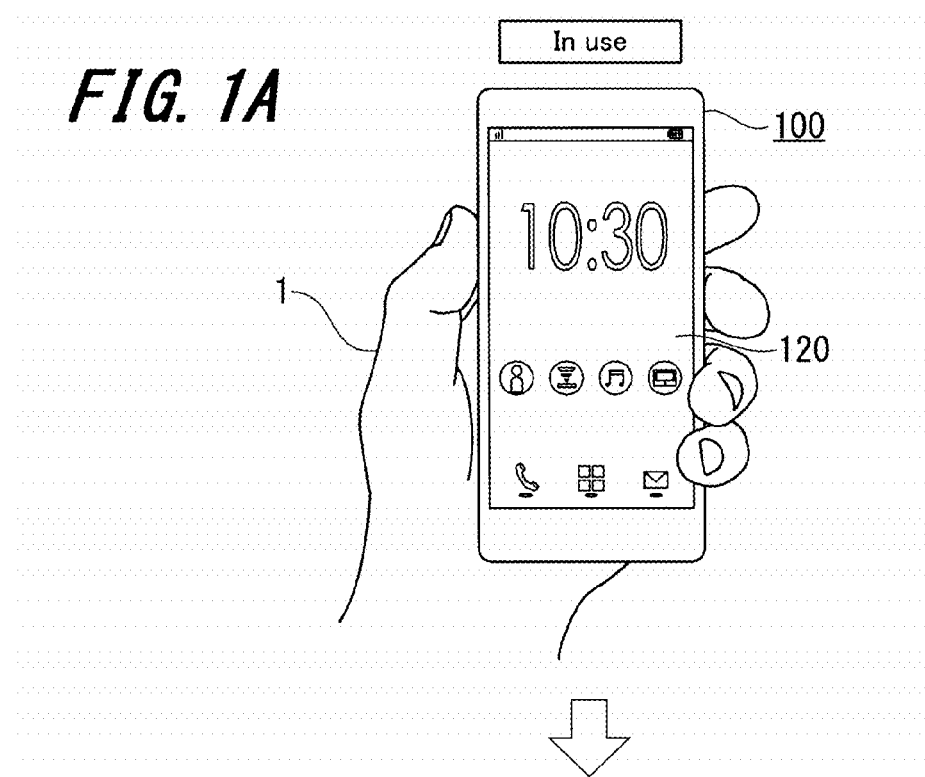
FIG. 1A is an exemplary illustration of a terminal device while in use according to certain embodiments.

In the drawings, like reference numerals designate identical or corresponding parts throughout the several views. Further, as used herein, the words "a," "an" and the like generally carry a meaning of "one or more," unless stated otherwise. The drawings are generally drawn to scale unless specified otherwise or illustrating schematic structures or flowcharts.

Furthermore, the terms "approximately," "about," and similar terms generally refer to ranges that include the identified value within a margin of 20%, 10%, or preferably 5%, and any values therebetween.

This disclosure relates to an illumination control method for a terminal device. For the remainder of this description, the phrase "terminal device" is meant to describe any sort of electronic device with a touchscreen display and a backlight such as a Smart Phone, tablet, laptop, electronic book reader, portable music player, game terminal, and the like. This phrase is not meant to limit the scope of this disclosure, but is used to merely provide a more concise description.

FIG. 1A is an exemplary illustration of a terminal device while in use according to certain embodiments. In certain aspects, the terminal device 100 that is held in the hand 1 of a user is a Smart Phone with a display panel 120 that consists of a liquid crystal display (LCD) panel with a touchscreen and a backlight. When the terminal device 100 is in use, the screen of the display panel 120 is bright, and the user can browse the content displayed on the screen. As will be described in detail in later paragraphs, a determination of whether the terminal device 100 is in use is made based on measurements by one or more sensors such as accelerometers.

Figure 1B:
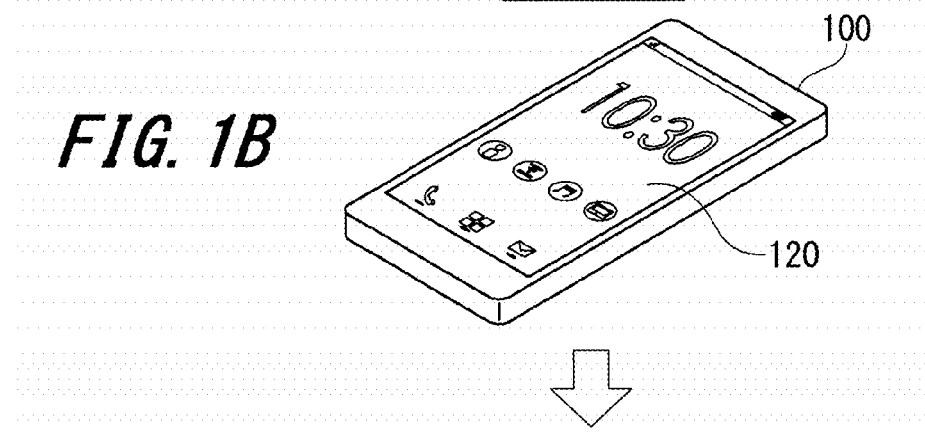
FIG. 1B is an exemplary illustration of a terminal device with a backlight that is illuminated while not in use according to certain embodiments.

FIG. 1B is an exemplary illustration of a terminal device with a backlight that is illuminated while not in use according to certain embodiments. According to certain embodiments, an illuminated backlight while the terminal device is not in use may occur when the user has laid the terminal device 100 on a flat surface such as a table or desk. As will be discussed in detail in later paragraphs, the display panel 120 remains illuminated for a predetermined period of non-use that is determined by the user. According to one embodiment, after a first predetermined period of non-use, the backlight of the display panel 120 is dimmed so that the screen is still visible, but the back light lowers to indicate to the user that the terminal device has entered a period of non-use.

Figure 1C:
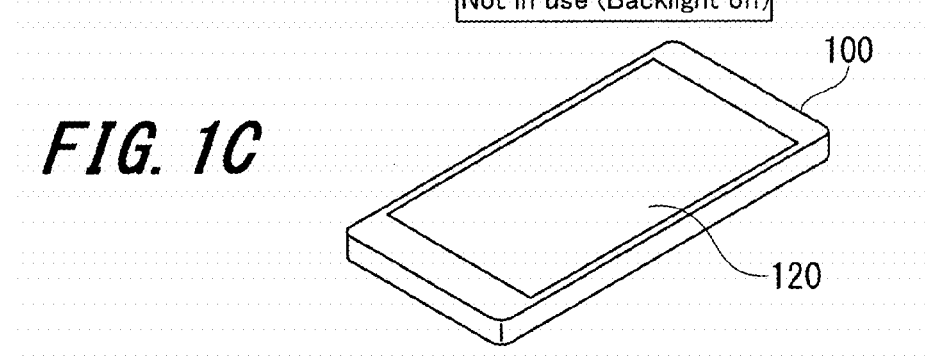
FIG. 1C is an exemplary illustration of a terminal device with a backlight that is turned off while not in use according to certain embodiments.

FIG. 1C is an exemplary illustration of a terminal device with a backlight that is turned off while not in use according to certain embodiments. When the terminal device 100 is not in use for the predetermined period of time determined by the user, the backlight of the display panel 12 turned off. According to certain embodiments, the predetermined period of non-use that triggers extinguishing the backlight of the terminal device 100 may follow the dimming of the backlight after a first predetermined period of non-use.

Figure 2:
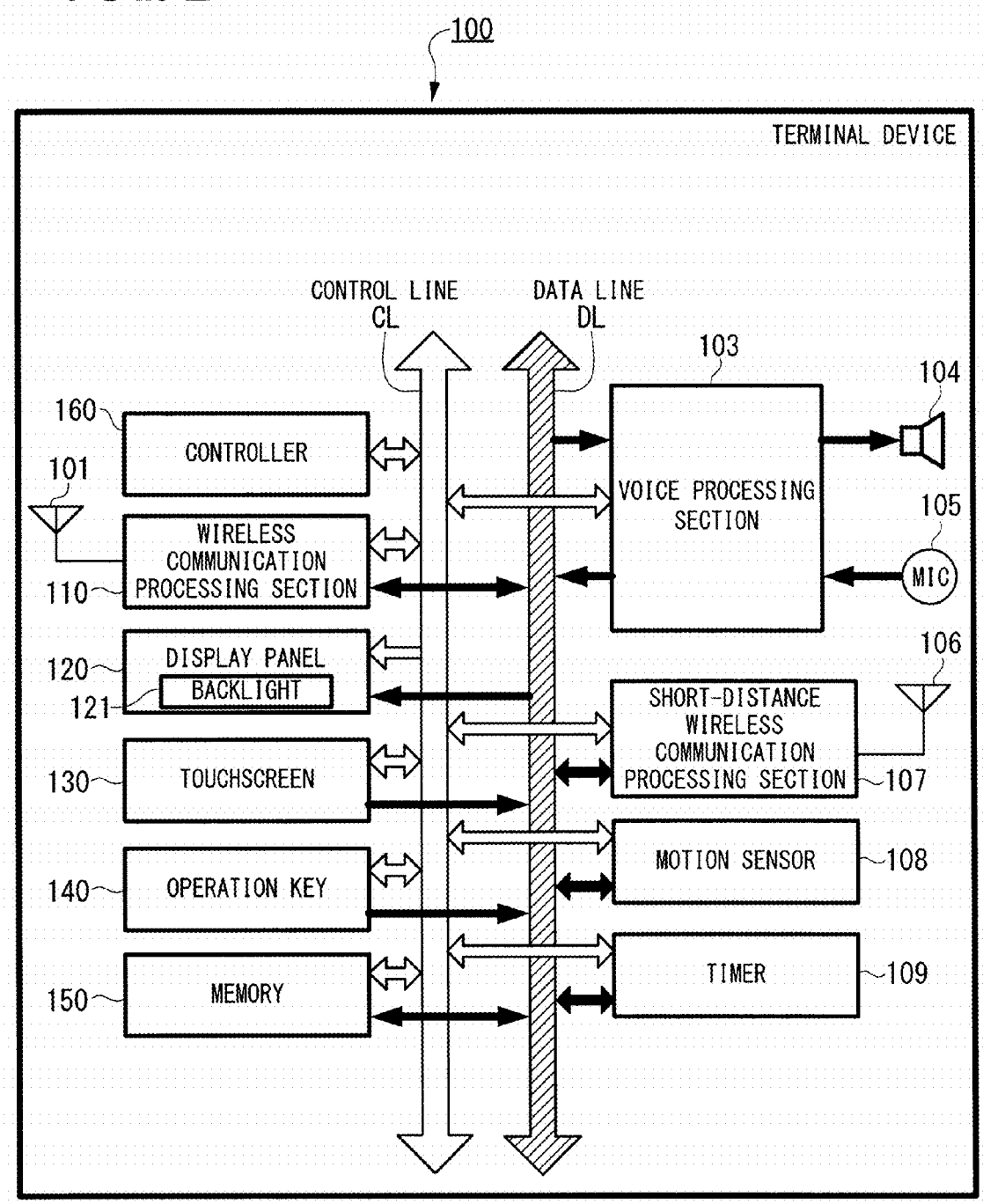
FIG. 2 illustrates a non-limiting example of a block diagram for a terminal device, according to certain embodiments.

FIG. 2 illustrates a non-limiting example of a block diagram for a terminal device, according to certain embodiments. The block diagram of the terminal device 100 includes sensors and processing circuitry for illumination control. The terminal device 100 is equipped with an antenna 101 for wirelessly communicating with cell towers. The antenna 101 is connected to the wireless communication processing section 110. The wireless communication processing section 110 performs the processes of transmitting and receiving radio signals under the control of the controller 160. The controller 160 may include one or more Central Processing Units (CPUs), and may control each element in the terminal device 100 to perform features related to communication control, audio signal processing, control for the audio signal processing, control for display panel 120 processing, motion sensor processing, and other types of processing. The controller 160 may perform these functions by executing instructions stored in a memory 150. Alternatively or in addition to the local storage of the memory 150, the features may be executed using instructions stored on an external device accessed on a network, or on a non-transitory computer readable medium.

According to certain embodiments, the controller 160 estimates whether the user has the terminal device 100 in his or her hand 1 based on at least one detection signal that corresponds to the movement of the terminal device 100 that is generated by the motion sensor 108. The controller 160 controls the drive of the backlight 121 of the display panel 120 based on the determination of whether the terminal device 100 is in use or not in use.

In addition to storing the instructions to be executed by the controller 160, the memory 150 stores data generated by user operation of the terminal device 100. In certain embodiments, the predetermined periods of non-use of the terminal device 100 that trigger either a reduction in brightness of the backlight 121 or the extinguishing of the backlight 121 are stored in the memory 150. The storage of data in the memory 150 and read-out of data from memory 150 are performed under the control of the controller 160.

The terminal device 100 includes a control line CL and data line DL as internal communication bus lines. Control data to/from the controller 160 may be transmitted through the control line CL. The data line DL may be used for transmission of voice data, display data, etc.

Voice data received by the wireless communication processing section 110 is sent to the voice processing section 103 through the data line DL. The voice processing section 103 demodulates the voice data and obtains an analog voice signal. The analog voice signal is supplied to a speaker 104, and the speaker 104 outputs a sound corresponding to the analog voice signal. In addition, the voice processing section 103 converts a voice signal from a microphone 105 to voice data that is supplied to the wireless communication processing section 110 through the data line DL. The voice data that is sent to the wireless communication processing section 110 is then converted to packets for radio transmission. If the terminal device 100 is not equipped with a voice call function, the voice processing section 103, speaker 104, and microphone 105 may be omitted.

When the terminal device 100 is conducting data communication which may include the transmission or reception of electronic mail via a network, such as the internet, the wireless communication processing section 110 transmits or receives the data under the control of the controller 160. In certain embodiments, the data received by the wireless communication processing section 110 are stored in the memory 150, and the controller 160 is responsible for controlling the process of displaying the data that is stored in the memory 150. In addition, data stored in the memory 150 may be sent to the wireless communication processing section 110 in order to be radio-transmitted. When the user desires to discard data such as unwanted electronic mail, the controller 160 erases the data stored in the memory 150.

The terminal device 100 includes a display panel 120 that contains a backlight 121. The display panel 120 displays still and moving image data via the controller 160. The display panel 120 may also display operational inputs such as numbers or icons, which may be used for control of the terminal device 100. The display panel 120 may additionally display a graphical user interface such that the user may control aspects of the terminal device 100 and/or other devices. In certain embodiments, the controller 160 may control the display panel 120 to display a home screen interface, the most recent interface, or another interface of the terminal device 100. Further, the display panel 120 may display characters and images received by the terminal device 100 and/or stored in the memory 150 or accessed from an external device on a network. For example, the terminal device 100 may access a network such as the Internet, and display text and/or images transmitted from a Web server.

The display screen of the display panel 120 may be a Liquid Crystal Display (LCD) screen, an organic electroluminescence display panel, or another display screen technology. The backlight 121 illuminates the back surface of the display screen by an edge-lit system, a direct-lit system, and the like. The light source for the backlight 121 may be Light Emitting Diodes (LED), Cold-Cathode Fluorescent Lamps (CCFL), and the like.

The terminal device 100 is also equipped with a touchscreen 130, which is able to detect when an object such as a finger or a pen touches the display screen. Used herein, the phrase "touch operation" refers to an input operation performed by touching an operation surface of the touchscreen 130 with an instruction object, such as a finger, pen, or stylus-type instrument. In certain aspects of the present disclosure, the touchscreen 130 may be disposed adjacent to the display panel 120 (e.g., laminated), or may be formed integrally with the display panel 120. For simplicity, the present disclosure assumes the touchscreen 130 is formed integrally with the display panel 120 and therefore, examples discussed herein may describe touch operations being performed on the surface of the display panel 120 rather than the touchscreen 130. However, the skilled artisan will appreciate that this is not limiting.

For simplicity, the present disclosure assumes the touchscreen 130 is an electrostatic capacitance-type touch panel technology; however, it should be appreciated that aspects of the present disclosure may easily be applied to other touch panel types (e.g., resistance type touch panels) with alternate structures. In the case of an electrostatic-capacitance touch panel display, when conductors, such as a finger or stylus, approach or contact the touchscreen 130, the electrodes of the touchscreen 130 may detect and measure electrostatic capacitance changes, and features of the touch operation may be determined based on the detections/measurements.

In certain aspects of the present disclosure, the touchscreen 130 may include transparent electrode touch sensors arranged in the X-Y direction on the surface of transparent sensor glass. In this aspect, the X-axis is a horizontal axis, and the Y-axis is a vertical axis, which are orthogonally crossed. In certain embodiments, the data regarding the position on the X-Y axis that the touch operation occurred is transmitted to the controller 160, which then activates an application based on the touch position. In addition, if more than one touch operation occurs simultaneously in different positions on the display panel 120, the controller 160 may detect that one or more areas of the display panel 120 have been touched or that a wide area of the display panel 120, which may include the entire display panel 120, has been touched.

Next, an operation key 140 may include one or more buttons or similar external control elements, which may generate an operation signal based on a detected input from a user. In addition to outputs from the touchscreen 130, these operation signals may be supplied to the controller 160 for performing related processing and control. In certain aspects of the present disclosure, the processing and/or functions associated with external buttons and the like may be performed by the controller 160 in response to an input operation on the touch panel display screen rather than the external button, key, etc. In this way, external buttons on the terminal device 100 may be eliminated in lieu of performing inputs via touch operations, thereby improving water-tightness.

Next, a short distance wireless communication processing section 107 is configured to communicate wirelessly with external devices, e.g., via a wireless protocol such as Bluetooth, Near Field Communication (NFC), Wi-Fi, 802.11, etc. This short distance wireless communication processing section 107 enables the terminal device 100 to wirelessly communicate via an antenna 106 with other devices within the range of approximately tens of meters.

The terminal device 100 is also equipped with a motion sensor 108 that outputs a detection signal, referred to as a sensor value, to the controller 160 according to the movement of the terminal device 100. In some aspects, the motion sensor 108 may be an accelerometer, gyro sensor, or geomagnetic sensor. In an embodiment where the motion sensor 108 is a triaxial accelerometer, the motion sensor 108 outputs the sensor value in the direction of an X-axis, a Y-axis, and a Z-axis.

Next, a timer 109 is a part of the terminal device 100 that is directed by the controller 160 based on function of an application to count a predetermined time and measures the remaining time. The remaining time is output to the controller 160. The terminal device 100 is also equipped with a power supply such as a battery that supplies electric power to each part of the terminal device 100.

Figure 3:
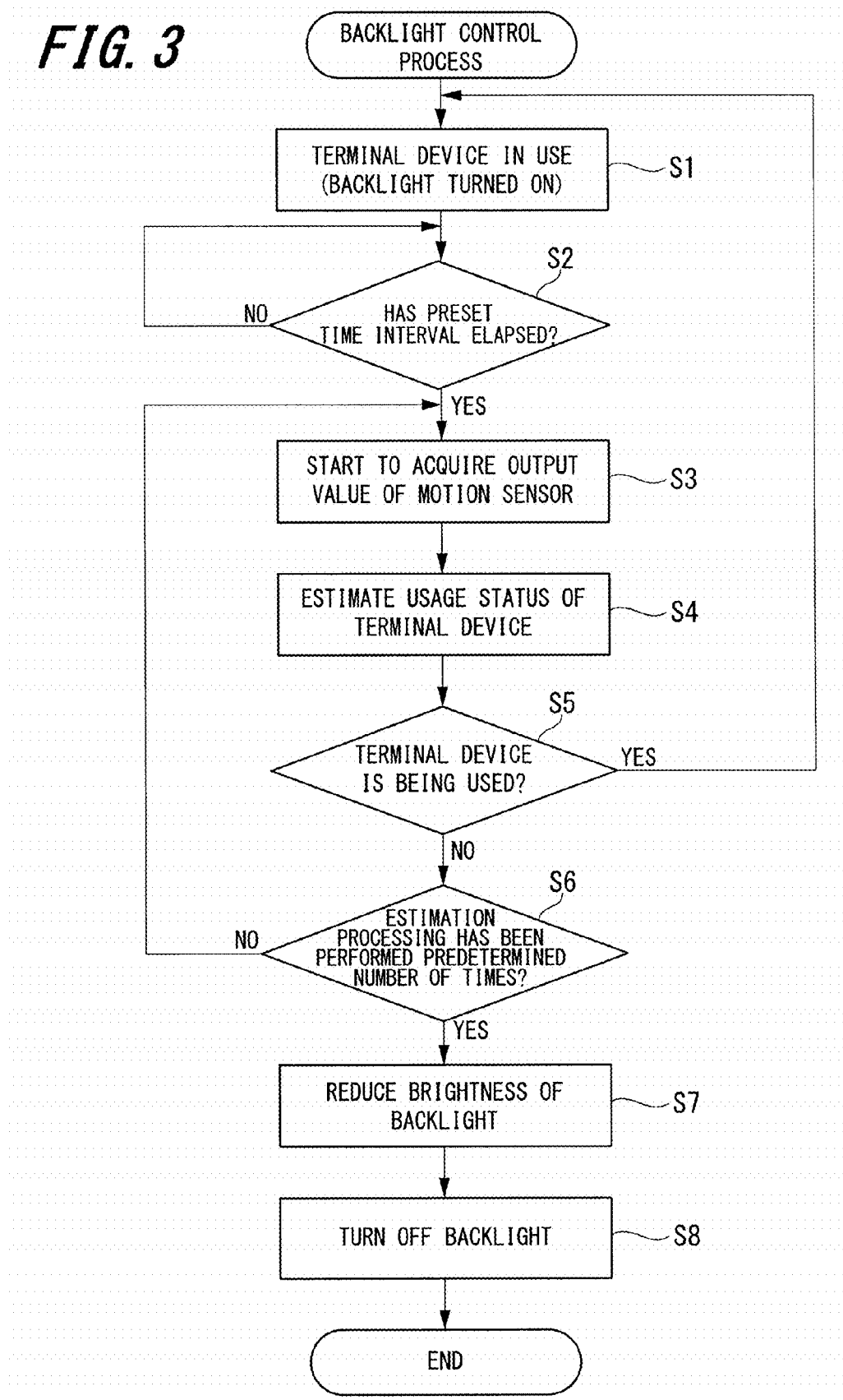
FIG. 3 illustrates a non-limiting exemplary flowchart for controlling the backlight of a terminal device, according to certain embodiments.

Next, FIG. 3 illustrates a non-limiting exemplary flowchart for controlling the backlight of a terminal device, according to certain embodiments.

The processing illustrated in FIG. 3 begins at step S1 where the controller 160 determines that the terminal device 100 is in use. The determination by the controller 160 that the terminal device 100 is in use is made based on input from the touch panel 130 or the operation key 140 that the user has operated either the touch panel 130 or the operation key 140. The controller 160 then sends a signal to a drive circuit, and the backlight 121 is lit.

Next, at step S2, the controller determines whether the terminal device 100 has been in a period of non-use for a preset time interval that is several seconds prior to a time at which the brightness of the backlight 121 will be reduced. The controller 160 makes this determination that the terminal device is in a period of non-use based on input from the touch panel 130 or the operation key 140. The time at which the brightness of the backlight 121 is reduced may be a default value or may be a value determined by the user that is stored in memory 150. The preset time interval also corresponds to the time at which the controller 160 initiates the acquisition of sensor values from the motion sensor 108. In one example, the preset time interval is 7 seconds before the backlight is set to be reduced, which also takes into account the sample period and the number of status usage estimation calculations that are performed. The status usage estimation calculations are discussed in further detail with respect to steps S4 and S6. The timer 109 measures the remaining time until the preset time interval of non-use elapses. The controller 160 then acquires the measured value from the timer 109 and compares the measured value from the timer 109 to the preset time interval. If the comparison results in a "yes," where the preset time interval has elapsed, then step S3 is executed. Otherwise, if the comparison to the preset time interval is not satisfied at step S2, resulting in a "no," then the controller 160 repeats the determination process of acquiring the measured value from the timer 109 and comparing it to the preset time interval.

At step S3, the controller 160 acquires at least one sensor value from the motion sensor 108 when the terminal device 100 has been in a period of non-use for the predetermined period of time. The motion sensor 108 outputs the sensor value according to the movement of the terminal device 100 to the controller 160 with a predetermined sampling period and frequency. The motion sensor 108 receives a command signal from the controller 160 to commence measuring the motion of the terminal device when the predetermined period of time that is several seconds before the preset time at which the brightness of the backlight 121 is reduced has elapsed. According to one example, the sampling time period of the motion sensor 108 is 1 s (second), and the sampling frequency is 16 Hz (Hertz). This means that in 1 second of sampling, the motion sensor 108 outputs 16 samples of sensor values per axis.

At step S4, the controller 160 estimates the usage status of the terminal device 100 based on the sensor value acquired by motion sensor 108. The term "usage status" describes whether the terminal device 100 is "in use," such as when the terminal device or is being held and/or operated by a user, or "not in use," such as when the terminal device 100 is on a desk or in a bag or pocket. The controller 160 performs status usage estimation calculations and stores them in memory 150 until a predetermined number of status usage estimations are performed. The number of status usage estimation calculations that have been performed is also stored in the memory 150. Further details of the status usage estimation algorithm are discussed with respect to FIG. 4.

At step S5, the controller 160 determines whether the terminal device 100 is in use or not in use based on the status usage estimation calculations at step S4. If the controller 160 determines that the terminal device 100 is in use, resulting in a "yes," then the process returns to step S1, and the backlight 121 remains illuminated. The controller 160 also resets the timer 109, which postpones dimming or turning off the backlight 121. Otherwise, if the controller 160 has performed the predetermined number of status usage estimations and determines that the terminal device 100 is not in use, resulting in a "no," step S6 is executed.

At step S6, the controller 160 determines whether the predetermined number of status usage estimation calculations have been performed. If the number of status usage estimation calculations is less than the predetermined threshold, resulting in a "no," the process returns to step S3 to perform another status usage estimation calculation. By performing status usage estimation calculations multiple times, the precision of the usage determination increases. Otherwise, if the number of status usage estimation calculations has reached the predetermined threshold, resulting in a "yes," the process proceeds to step S7.

According to one implementation, the predetermined time that is several seconds prior to the time at which the brightness of the backlight 121 will be reduced is set to 2 seconds prior to the brightness of the backlight 121 being reduced. The sampling period for the motion sensor 108 is set to 1 second, and the predetermined number of status usage estimation calculations is set to 5. With these settings, the controller 160 initiates the sensor value acquisition at step S3 and the status usage estimation calculations at step S4 7 seconds prior to the time at which the backlight 121 is set to be reduced.

At step S7, when the controller 160 has performed the predetermined number of status usage estimation calculations, and it has been determined that the terminal device 100 is not in use, the brightness of the backlight 121 is reduced. The controller 160 sends a signal to a drive circuit which dims the backlight 121 to an extent such that the user is almost unable to confirm the content on the display panel 120.

At step S8, if the user does not perform an operation with respect to the touch panel 130 or the operation key 140 within a predetermined time interval after the brightness of the backlight 121 has been reduced, the backlight 121 of the terminal device is turned off. The controller 160 sends a signal to a drive circuit that extinguishes the backlight 121. In certain embodiments, the controller 160 turns off the backlight in two steps: by reducing the brightness of the backlight 121 at step S7 and then completely turning of backlight 121 at step S8 after the predetermined time interval. In some aspects, the predetermined time interval for turning off the backlight 121 at step S8 may be set to immediately after the backlight 121 is reduced at step S7 so that the time period of having the dimmed backlight 121 is eliminated.

In certain embodiments, the terminal device 100 is installed with an application that automatically rotates the screen of the terminal device 100 based on the orientation of the terminal device 100. The screen rotation application may depend on an input from the motion sensor 108 to determine the orientation of the terminal device 100. In this example, executing the screen rotation application may trigger a delay in starting the timer to dim or turn off the backlight 121. However, if the terminal device 100 is not installed with an application that automatically rotates the screen of the terminal device 100, no delay in starting the timer to dim or turn off the backlight 121 is introduced.

Figure 4:
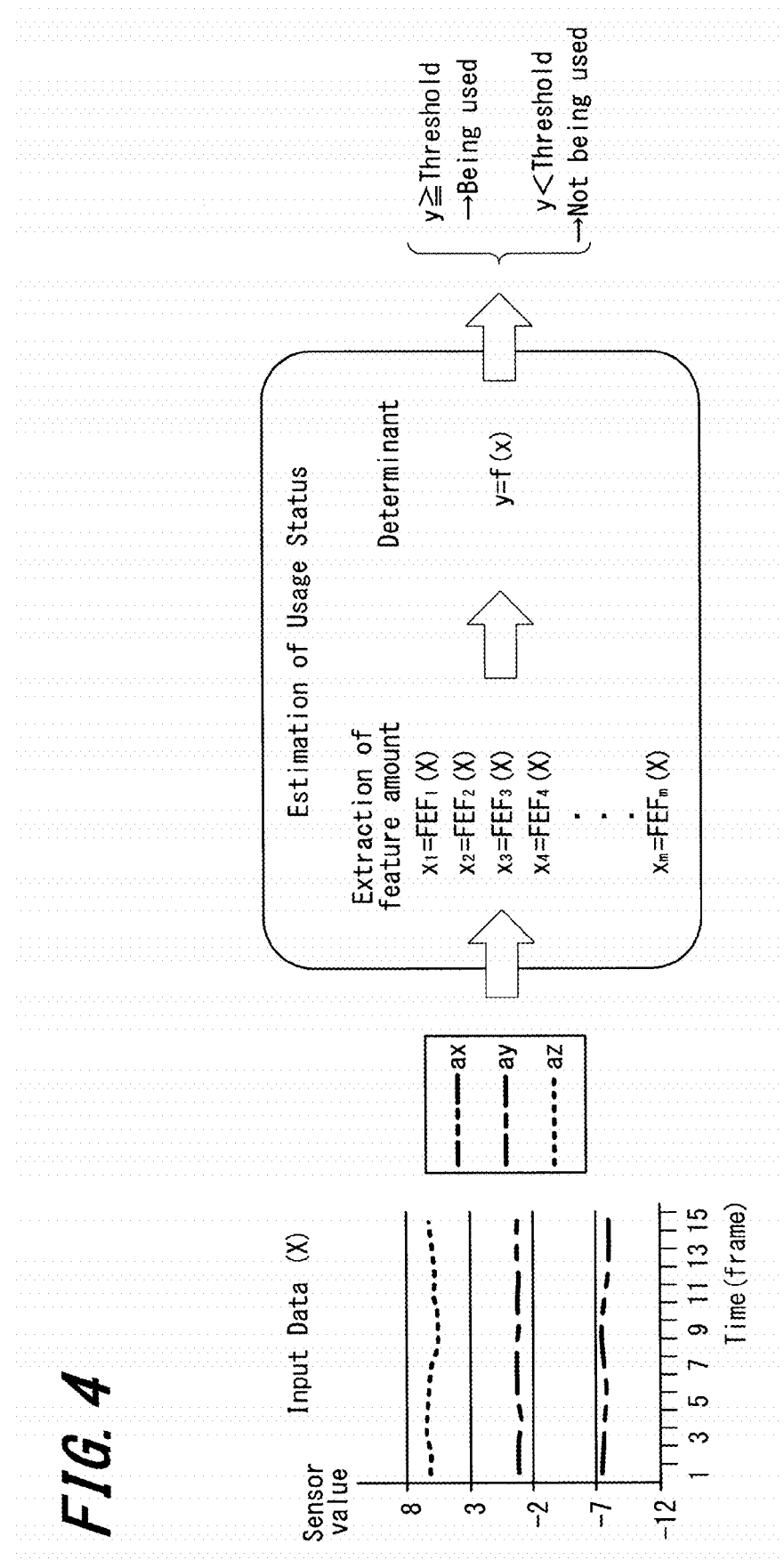
FIG. 4 is a non-limiting exemplary illustration of the terminal device status usage estimation algorithm according to certain embodiments.

Next, FIG. 4 is a non-limiting exemplary illustration of the terminal device status usage estimation algorithm according to certain embodiments, which estimates the usage status of the terminal device 100. The controller 160 reads program instructions for the terminal device status use estimation algorithm from the memory 150 and executes the instructions to perform the status usage estimation calculation. The controller 160 estimates the usage status of the terminal device 100 based on the sensor value of at least one motion sensor 108 installed in the terminal device 100. For simplicity, the present disclosure assumes the motion sensor 108 is a triaxial accelerometer. In the graph of the input data (X), "ax" represents the detection signal of the X-axis of the accelerometer. Similarly, "ay" represents the detection signal of the Y-axis of the accelerometer, and "az" represents the detection signal of the Z-axis of the accelerometer.

As shown in FIG. 4, the controller 160 uses the input data, X, which contains the sensor values ax, ay, and az, and extracts a m-dimensional feature value function $x_1$-$x_m$ with a m-piece feature extraction function (FEF). The controller 160 estimates the usage status of the terminal device 100 by computing a discriminant, $y=f(x)$, of the feature value function. When the terminal device is in use, such as when the user is holding the terminal device 100 in his or her hand, the discriminant of the feature value function becomes much greater than the discriminant of the feature value function when the terminal device 100 is not in use. If the discriminant is greater than or equal to a predetermined threshold, the terminal device is determined to be in use. If the discriminant is less than a predetermined threshold, the terminal device is determined to be not in use. According to certain embodiments, the predetermined discriminant threshold is determined through general discriminant learning techniques which may include linear discrimination, logistic regression, support vector machines (SVM), relevant vector machines (RVM), AdaBoost, neural networks, k-nearest neighbors (k-NN), and the like.

Figure 5:
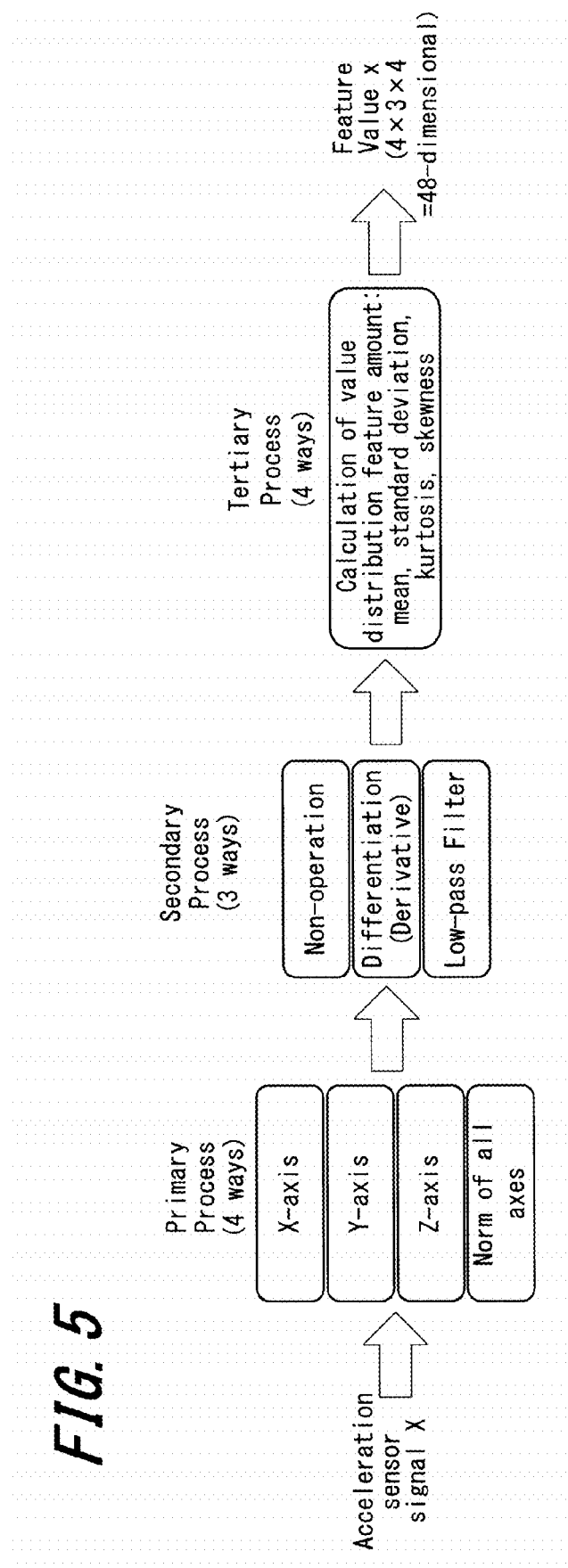
FIG. 5 is a non-limiting exemplary illustration of the feature extraction function of the terminal device status estimation algorithm according to certain embodiments.

Next, FIG. 5 is a non-limiting exemplary illustration of the feature extraction function of the terminal device status usage estimation algorithm according to certain embodiments. The feature extraction function computes the feature value function through three processes. A primary process takes the sensor signal from the triaxial accelerometer and outputs an X-axis signal, a Y-axis signal, a Z-axis signal, and norm of the sensor values of all three axes. The primary process is discussed in further detail with respect to FIG. 6. A secondary process takes the output of the primary process and computes a non-operation signal, a differential signal, and a low-pass filter signal. The secondary process is discussed in further detail with respect to FIG. 7. A tertiary process takes the output of the secondary process and computes values pertaining to the distribution of the output of the secondary process, which may include mean, standard deviation, kurtosis, and skewness. The tertiary process is discussed in further detail with respect to FIG. 8. In certain embodiments, the feature extraction function extracts 3 dimensions from the primary process, 4 dimensions from the secondary process, and 4 dimensions from the tertiary process. The result of combining the features-values extracted from all three processes is a 48-dimension feature value function.

Figure 6:
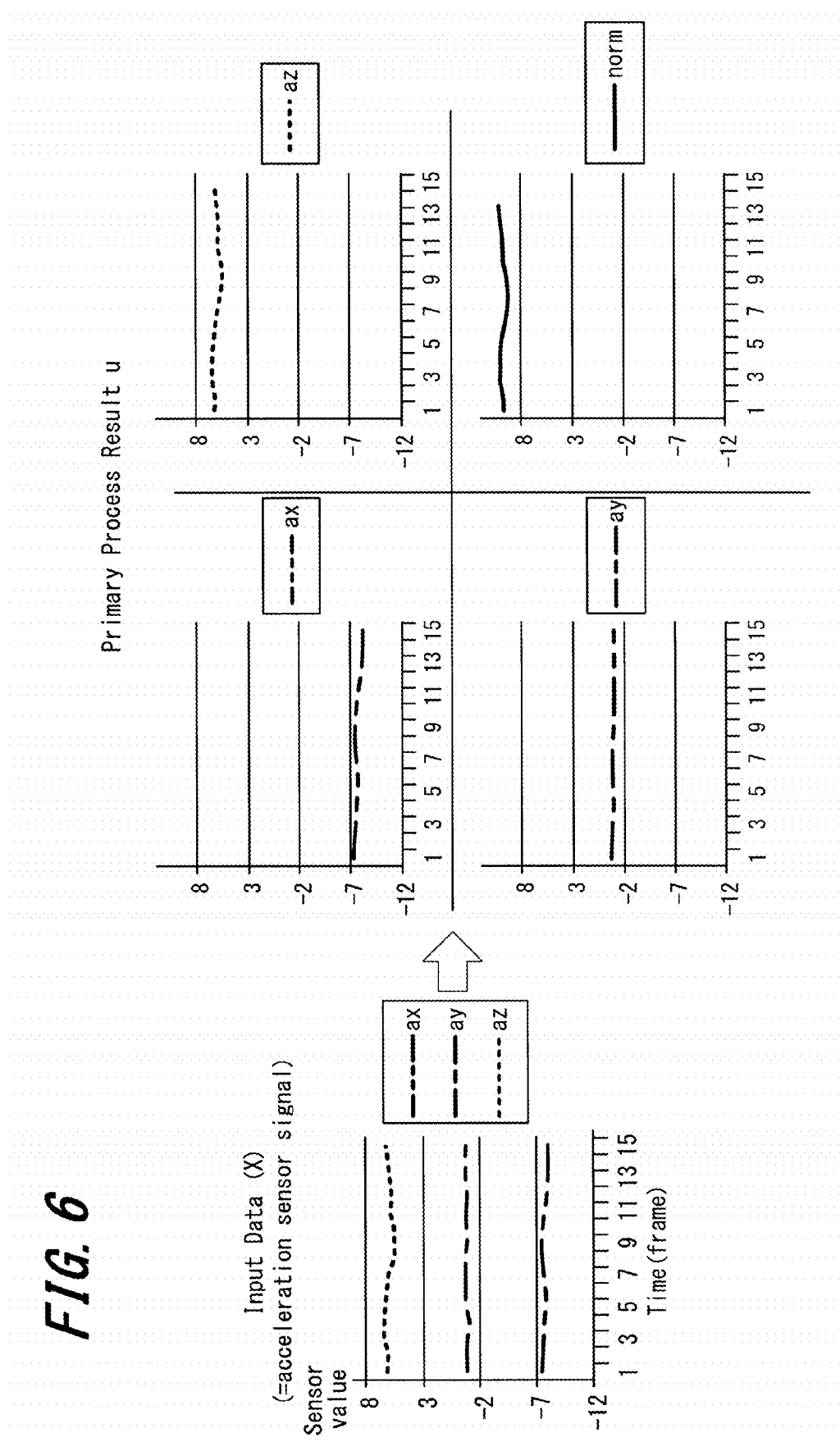
FIG. 6 is an exemplary illustration of the primary process of the feature extraction function of the terminal device status usage estimation algorithm according to certain embodiments.

Next, FIG. 6 is an exemplary illustration of the primary process of the feature extraction function of the terminal device status usage estimation algorithm according to certain embodiments. The controller 160 receives the input data, X, from the motion sensor 108 in the terminal device 100, which contains the sensor values ax, ay, and az. From the input data, X, the controller 160 extracts the detection signals from the X-axis, the Y-axis, and the Z-axis, and computes the norm of the ax, ay, and az detection signals. The result of the primary process is a 4-dimension function, u, consisting of signals ax, ay, az, and norm{ax, ay, az}. The four graphs of the 4-dimension function, u, in FIG. 6 show the sensor values with respect to time for the signals ax, ay, az, and norm{ax, ay, az}. In certain embodiments, the norm of the detection signals is the square root of the sum of the squares of the absolute values of the detection signals of each axis according to the equation, norm{ax, ay, az}= $\sqrt{|ax|^2+|ay|^2+|az|^2}$. In an example where the terminal device 100 is not in use and is at rest on a desk, norm{ax, ay, az} is approximately equal to 9.8 m/s$^2$ (meters per second squared). In certain embodiments, a normalization process may be applied to the feature values obtained through the primary process so that the range of feature values remains consistent between different types of terminal devices.

Figure 7:
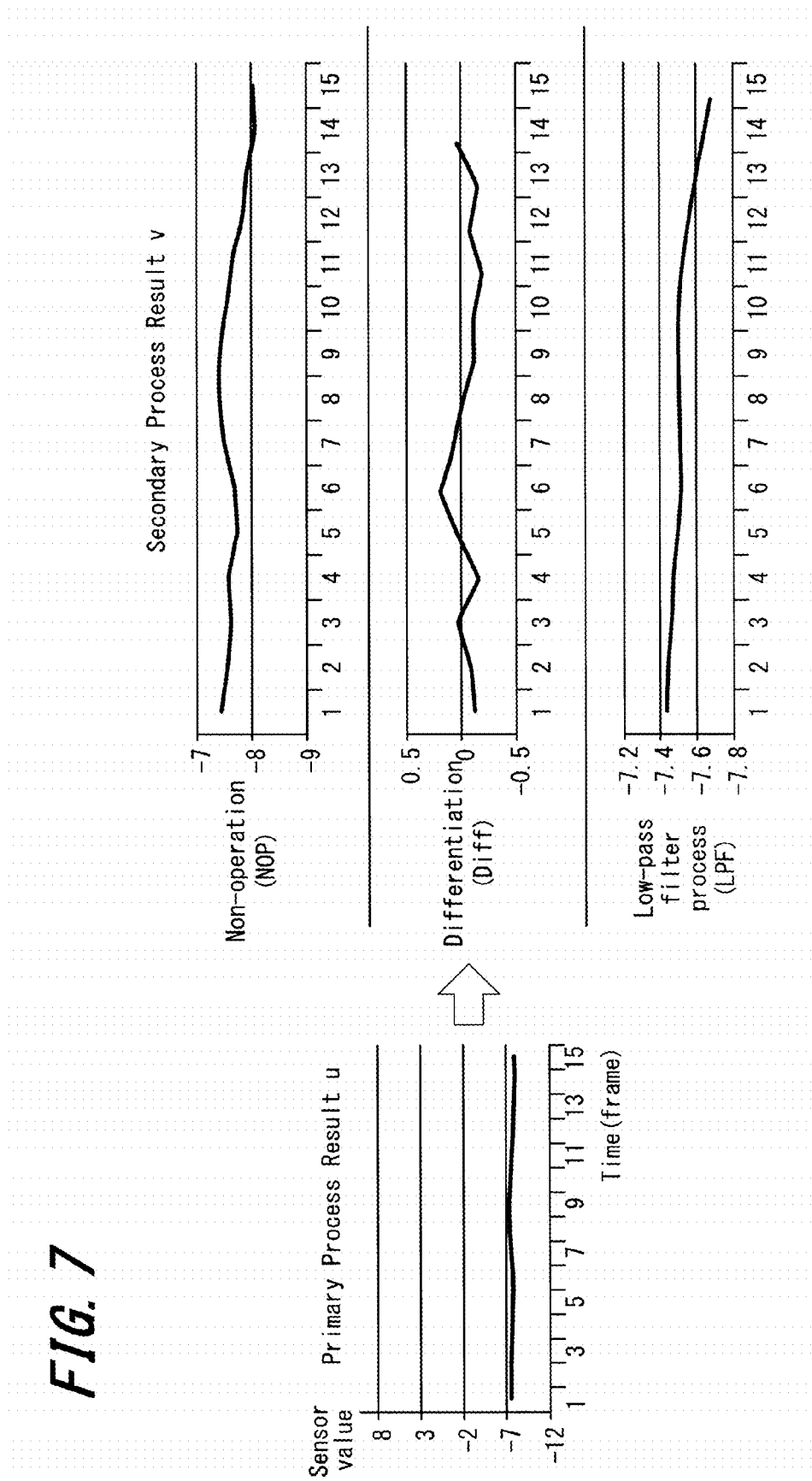
FIG. 7 is an exemplary illustration of the secondary process of the feature extraction function of the terminal device status usage estimation algorithm according to certain embodiments.

Next, FIG. 7 is an exemplary illustration of the secondary process of the feature extraction function of the terminal device status usage estimation algorithm according to certain embodiments. In this aspect, the controller 160 performs the secondary process on the output of the primary process, u, which includes the signals ax, ay, az, and norm{ax, ay, az}. FIG. 7 shows the secondary process for the ax detection signal, which is displayed in the graph on the left, but the same secondary process is performed with respect to the ay, az, and norm{ax, ay, az} signals. From the output of the primary process, u, the controller 160 computes the output of the secondary process, v, by performing a non-operation (NOP) function, a differentiation (Diff) function, and a low pass filter (LPF) process. The three graphs of the 3-dimension function, v, in FIG. 7 shows the non-operation (NOP) signal, a differentiation (Diff) signal, and a low pass filter (LPF) signal with respect to time. The non-operation (NOP) function does not perform any operation on the input signal, and thus outputs a signal that is the same as the input signal. The differentiation (Diff) function takes the derivative of the input signal, which is the rate of the change of the acceleration that the motion sensor 108 detects. In some instances, the rate of change of acceleration is referred to as jerk, jolt, or surge. The low pass filter (LPF) process applies a low pass filter to the input signal, which may be the acceleration that the motion sensor 108 detects. The integral of the acceleration signal corresponds to a velocity of the terminal device 100. In certain embodiments, a normalization process may be applied to the feature values obtained through the secondary process so that the range of feature values remains consistent between different types of terminal devices.

Figure 8:
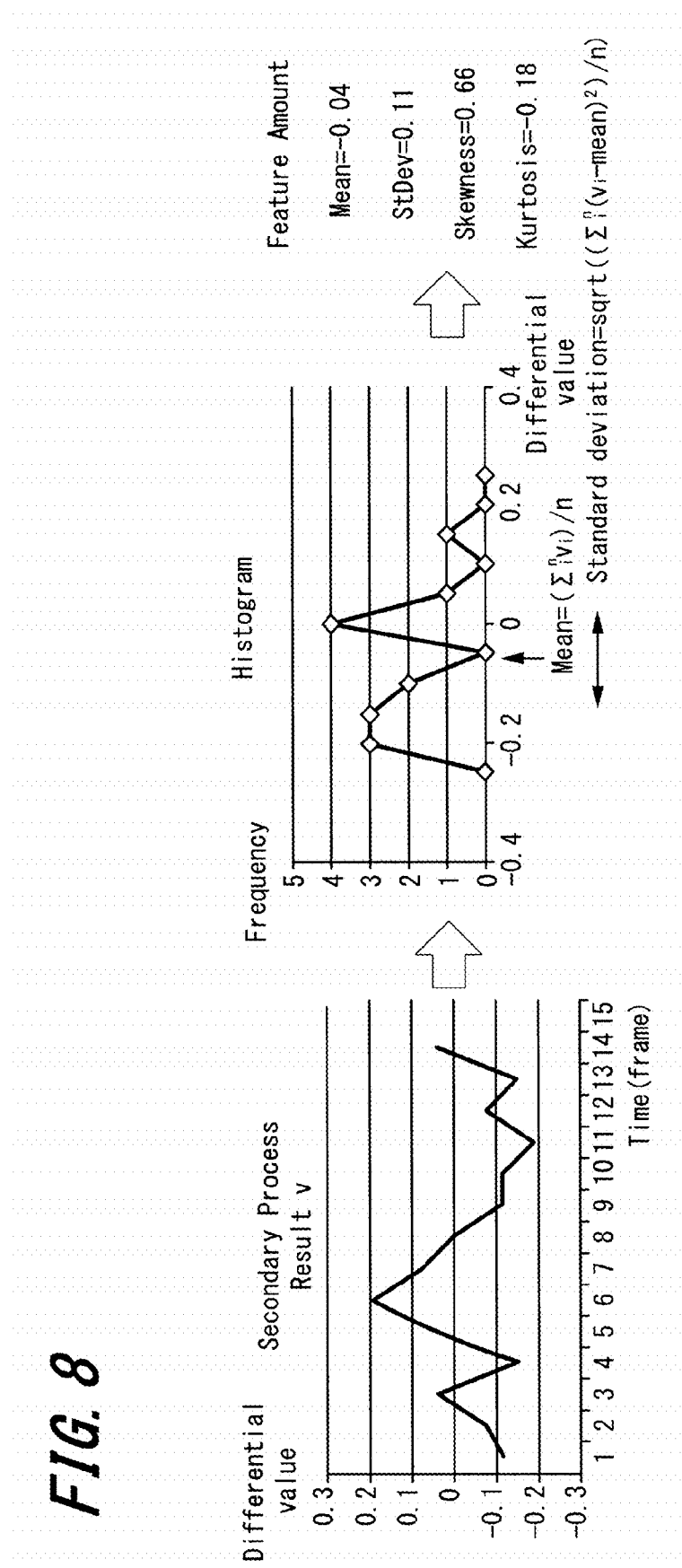
FIG. 8 is an exemplary illustration of the tertiary process of the feature extraction function of the terminal device status usage estimation algorithm according to certain embodiments.

Next, FIG. 8 is an exemplary illustration of the tertiary process of the feature extraction function of the terminal device status usage estimation algorithm according to certain embodiments. In this aspect, the controller 160 performs the tertiary process on the output of the secondary process, v, which includes the non-operation (NOP), differentiation (Diff), and low pass filter (LPF) signals. FIG. 8 displays the tertiary process for the differentiation (Diff) signal, which is displayed in the graph on the left, but the same tertiary process is performed with respect to the non-operation (NOP) and low pass filter (LPF) signals. From the output of the secondary process, v, the controller 160 executes the tertiary process by computing a mean, standard deviation, skewness, and kurtosis for each signal. The graph on the right side of FIG. 8 is a histogram showing the distribution of signal values. The horizontal axis is the derivative value, and the vertical axis displays the frequency with which the derivative values occur. From the histogram, the mean, the standard deviation, the skewness, and the kurtosis are calculated for the distribution of the differentiation (Diff) signal. In this example, the mean is −0.04, the standard deviation is 0.11, the skewness is 0.66, and the kurtosis is −0.18. In certain embodiments, a normalization process may be applied to the feature values obtained through the tertiary process so that the range of feature values remains consistent between different types of terminal devices.

In certain embodiments, an orientation or a direction of movement of the terminal device 100 may be obtained by analyzing the mean value of the tertiary process with respect to the acceleration sensor value of each axis output from the motion sensor 108. In addition, the magnitude of movement of the terminal device 100 may be obtained by analyzing the standard deviation, or variance, of the tertiary process with respect to the acceleration sensor value of each axis from the motion sensor 108. In certain embodiments, use or non-use of the terminal device 100 may also be observed by analyzing the skewness or kurtosis of the result of the tertiary process with respect to the acceleration sensor value of each axis from the motion sensor 108.

Next, FIG. 9 is an exemplary table describing how feature values of the terminal device are obtained from primary, secondary, and tertiary processes and how they relate to determining use or non-use of the terminal device according to certain embodiments. More specifically, the table illustrates which primary, secondary, and tertiary processes translate into quantifiable features that are able to describe whether the terminal device 100 is in use or not in use.

In one embodiment illustrated by the first row of the table, the primary process signals are the ax, ay, and az signals, the secondary process signals are the non-operation (NOP) and differentiation (Diff) signals, and the tertiary process computes the mean. The outputs of these processes are used to determine the orientation angle of the terminal device 100 or the direction of change in acceleration of the terminal device 100. For the orientation angle and direction of acceleration change of the terminal device 100, the output of the primary, secondary, and tertiary processes for a terminal device 100 that is in use versus a terminal device 100 that is not in use are likely to be unequal. For example, when a terminal device 100 is not in use, it may be placed flat on a desk so that it is lying horizontally, or it may be placed in a bag where it is positioned at an unlikely angle for a terminal device 100 that is in use. With regard to the change in direction of acceleration, if the terminal device 100 is not in use, it may experience a change in direction of acceleration that is unlikely for a terminal device that is in use and being held in the hand of the user during a touchscreen 130 operation or an operation key 140 operation.

In one embodiment illustrated by the second row of the table, the primary process signals are the ax, ay, az, and norm{ax, ay, az} signals, the secondary process signals are the non-operation (NOP), differentiation (Diff), and low pass filter (LPF) signals, and the tertiary process computes the standard deviation. The outputs of these processes are used to determine variance of the acceleration of the terminal device 100. For example, when the terminal device 100 is in use, the variance of the acceleration will be much larger than the variance of the acceleration when the terminal device 100 is not in use.

In one embodiment illustrated by the third row of the table, the primary process signals are the ax, ay, az, and norm{ax, ay, az} signals, the secondary process signals are the non-operation (NOP), differentiation (Diff), and low pass filter (LPF) signals, and the tertiary process computes the skewness and the kurtosis. The outputs of these processes are used to determine the shape of the distribution of the acceleration sensor values. In certain aspects, the kurtosis and skewness of a probabilistic distribution are used to describe how close the distribution is to a normal Gaussian distribution. The skewness of the distribution describes how symmetrical the distribution is relative to a normal distribution, and the kurtosis of the distribution describes how peaked the distribution is relative to a normal distribution. For example, when the terminal device 100 is not in use, the skewness and kurtosis of the distribution of the acceleration resemble that of a Gaussian distribution. When the terminal device 100 is in use, the skewness and kurtosis of the distribution of the acceleration deviate from that of a Gaussian distribution.

Obviously, numerous modifications and variations of the present disclosure are possible in light of the above teachings. It is therefore to be understood that within the scope of the appended claims, the invention may be practiced otherwise than as specifically described herein. For example, advantageous results may be achieved if the steps of the disclosed techniques were performed in a different sequence, if components in the disclosed systems were combined in a different manner, or if the components were replaced or supplemented by other components. The functions, processes and algorithms described herein may be performed in hardware or software executed by hardware, including computer processors and/or programmable processing circuits configured to execute program code and/or computer instructions to execute the functions, processes and algorithms described herein. A processing circuit includes a programmed processor, as a processor includes circuitry. A processing circuit also includes devices such as an application specific integrated circuit (ASIC) and conventional circuit components arranged to perform the recited functions.

The functions and features described herein may also be executed by various distributed components of a system. For example, one or more processors may execute these system functions, wherein the processors are distributed across multiple components communicating in a network. The distributed components may include one or more client and/or server machines, in addition to various human interface and/or communication devices (e.g., display monitors, smart phones, tablets, personal digital assistants (PDAs)). The network may be a private network, such as a LAN or WAN, or may be a public network, such as the Internet. Input to the system may be received via direct user input and/or received remotely either in real-time or as a batch process. Additionally, some implementations may be performed on modules or hardware not identical to those described. Accordingly, other implementations are within the scope that may be claimed.

The above disclosure also encompasses the embodiments noted below.

(1) A device comprising: circuitry configured to control a backlight to illuminate a display panel of the device; store a first preset time interval for reducing brightness of the backlight; determine that an input has not been received within the first preset time interval; acquire one or more signals from a sensor device corresponding to movement of the device; estimate whether the device is in use based on the one or more signals; and postpone a reduction in the brightness of the backlight based when a result of an estimate indicates that the device is in use.

(2) The device of (1), wherein the circuitry is configured to measure a time from when an input was last detected at the device.

(3) The device of (1) or (2), wherein the circuitry is configured to acquire the one or more signals from the sensor device when the measured time reaches a time corresponding to the first preset time interval.

(4) The device of any one of (1) to (3), wherein the circuitry is configured to detect an input operation as a touchscreen operation or an operation key operation.

(5) The device of any one of (1) to (4), wherein the circuitry is configured to reduce the backlight after the first preset time interval has elapsed and the estimate that the device is not in use.

(6) The device of any one of (1) to (5), wherein the circuitry is configured to store a second preset time interval for turning off the backlight after the backlight has been reduced.

(7) The device of any one of (1) to (6), wherein the circuitry is configured to turn off the backlight after the second preset time interval has elapsed and the estimate that the device is not in use.

(8) The device of (1) to (7), wherein the circuitry is configured to estimate whether or not the device is in use by applying a feature extraction function to the signals generated by the sensor device to calculate a multi-dimension feature value function.

(9) The device of any one of (1) to (8), wherein the circuitry is configured to calculate a discriminant from the multi-dimension feature value function.

(10) The device of any one of (1) to (9), wherein the discriminant of the multi-dimension feature value function is compared to a predetermined threshold to determine whether or not the device is in use.

(11) The device of any one of (1) to (10), wherein the circuitry is configured to perform an estimation of whether or not the device is in use a predetermined number of times.

(12) The device of any one of (1) to (11), wherein the circuitry is configured to perform a primary process of the feature extraction function that outputs a signal for one or more axes of the signal device and a norm of the signals of the one or more axes of the signal device.

(13) The device of any one of (1) to (12), wherein the circuitry is configured to perform a secondary process of the feature extraction function that outputs a non-operation signal, a differentiation signal, and a low pass filter signal based on the output of the primary process of the feature extraction function.

(14) The device of any one of (1) to (13), wherein the circuitry is configured to perform a tertiary process of the feature extraction function computes a mean, a standard deviation, a kurtosis, and a skewness based on the outputs of the secondary process of the feature extraction function.

(15) The device of any one of (1) to (14), wherein the circuitry is configured to determine an orientation of the device or a direction of change in acceleration of the device from the mean computed by the tertiary process of the feature extraction function.

(16) The device of any one of (1) to (15), wherein the circuitry is configured to determine a variance in the acceleration of the device from the standard deviation computed by the tertiary process of the feature extraction function.

(17) The device of any one of (1) to (16), wherein the circuitry is configured to determine a shape of a distribution of the movement of the device from the skewness and the kurtosis computed by the tertiary process of the feature extraction function.

(18) A method of controlling illumination of a device including: controlling a backlight to illuminate a display panel of the device; storing a first preset time interval for reducing brightness of the backlight; determining that an input has not been received within the first preset time interval; acquiring one or more signals from a sensor device corresponding to movement of the device; estimating whether the device is in use based on the one or more signals; and postponing a reduction in the brightness of the backlight based when a result of the estimate indicates that the device is in use.

(19) A non-transitory computer readable medium having instructions stored therein that, when executed by one or more processors, cause the one or more processors to perform a method of controlling illumination of a device, wherein the device includes a motion sensor, the method comprising: controlling a backlight to illuminate a display panel of the device; storing a first preset time interval for reducing brightness of the backlight; determining that an input has not been received within the first preset time interval; acquiring one or more signals from a sensor device corresponding to movement of the device; estimating whether the device is in use based on the one or more signals; and postponing a reduction in the brightness of the backlight based when a result of the estimate indicates that the device is in use.

The invention claimed is:

1. A device comprising:
  circuitry configured to
    control a backlight to illuminate a display panel of the device;
    store a first preset time interval for reducing brightness of the backlight;
    determine that an input has not been received within the first preset time interval;
    acquire one or more signals from a sensor device corresponding to movement of the device;
    estimate whether the device is in use based on a shape of a distribution of one or more features of a multi-dimensional feature extraction function calculated from the one or more signals,
    determine that the device is not in use in response to determining that the shape of the distribution of the one of more features of the multi-dimensional feature extraction function corresponds to a Gaussian distribution;
    postpone a reduction in the brightness of the backlight when the multidimensional feature extraction function calculated from the one or more signals indicates that the device is in use regardless of whether or not the input has been received at the device;
    and reduce the brightness of the backlight after the first preset time interval when the multi-dimensional feature extraction function calculated from the one or more signals indicates that the device is not in use.

2. The device of claim 1, wherein the circuitry is configured to measure a time from when an input was last detected at the device.

3. The device of claim 2, wherein the circuitry is configured to acquire the one or more signals from the sensor device when the measured time reaches a time corresponding to the first preset time interval wherein the first preset time interval corresponds to a predetermined amount of time before a time associated with reduction in the brightness of the backlight and the predetermined amount of time is based on a sample period of a usage estimation calculation.

4. The device of claim 1, wherein the circuitry is configured to detect an input operation as a touchscreen operation or an operation key operation.

5. The device of claim 1, wherein the circuitry is configured to reduce the backlight after the first preset time interval has elapsed and the estimate that the device is not in use.

6. The device of claim 1, wherein the circuitry is configured to store a second preset time interval for turning off the backlight after the backlight has been reduced.

7. The device of claim 6, wherein the circuitry is configured to turn off the backlight after the second preset time interval has elapsed and the estimate that the device is not in use.

8. The device of claim 1, wherein the circuitry is configured estimate whether or not the device is in use based on a discriminant calculated from the multi-dimensional feature extraction function.

9. The device of claim 8, wherein the circuitry is further configured to estimate that the device is in use in a case that the discriminant of the multi-dimensional feature extraction function is greater than a predetermined threshold.

10. The device of claim 9, wherein the circuitry is configured to perform the estimation of whether or not the device is in use a predetermined number of times.

11. The device of claim 10, wherein the circuitry is configured to estimate whether or not the device is in use based on a primary process of the multi-dimensional feature extraction function that outputs a signal for one or more axes of the sensor device and a norm of the signal of the one or more axes of the sensor device.

12. The device of claim 11, wherein the circuitry is configured to estimate whether or not the device is in use based on a secondary process of the multi-dimensional feature extraction function that outputs a non-operation signal, a differentiation signal, and a low pass filter signal based on the output of the primary process of the multi-dimensional feature extraction function.

13. The device of claim 12, wherein the circuitry is configured to estimate whether or not the device is in use based on a tertiary process of the multi-dimensional feature extraction function computes a mean, a standard deviation, a kurtosis, and a skewness based on the output of the secondary process of the multi-dimensional feature extraction function.

14. The device of claim 13, wherein the circuitry is configured to estimate whether or not the device is in use based on an orientation of the device or a directional change in acceleration of the device determined from the mean computed by the tertiary process of the multi-dimensional feature extraction function.

15. The device of claim 13, wherein the circuitry is configured to estimate whether or not the device is in use based on a variance in the acceleration of the device determined from the standard deviation computed by the tertiary process of the multi-dimensional feature extraction function.

16. The device of claim 13, wherein the circuitry is configured to estimate whether or not the device is in use based on the shape of the distribution of the one or more features of the multi-dimensional feature extraction function, wherein the one or more features include the skewness and the kurtosis computed by the tertiary process of the multi-dimensional feature extraction function.

17. The device of claim 1, wherein estimating whether or not the device is in use further includes calculating the multi-dimensional feature extraction function as a three-tiered 48-dimension feature value function, wherein
 a first tier includes four primary dimensions corresponding to a detection signal for one or more axes of the signal device and a norm of the detection signal of the one or more axes of the signal device;
 a second tier includes three secondary dimensions corresponding to a non-operation signal, a differentiation signal, and a low pass filter signal of the four primary dimensions of the first tier; and
 a third tier includes three tertiary dimensions corresponding to a mean, a standard deviation, a kurtosis, and a skewness of the three secondary dimensions of the second tier associated with each of the four primary dimensions of the first tier.

18. A method of controlling illumination of a device comprising:
 controlling a backlight to illuminate a display panel of the device;
 storing a first preset time interval for reducing brightness of the backlight;
 determining that an input has not been received within the first preset time interval;
 acquiring one or more signals from a sensor device corresponding to movement of the device;
 estimating whether the device is in use based on a shape of a distribution of one or more features of a multi-dimensional feature extraction function calculated from the one or more signals;
 determining that the device is not in use in response to determining that the shape of the distribution of the one of more features of the multi-dimensional feature extraction function corresponds to a Gaussian distribution;
 postponing a reduction in the brightness of the backlight based when a result of the estimate indicates that the device is in use;
 and reducing the brightness of the backlight after the first preset time interval when the multi-dimensional feature extraction function calculated from the one or more signals indicates that the device is not in use.

19. A non-transitory computer readable medium having instructions stored therein that, when executed by one or more processors, cause the one or more processors to perform a method of controlling illumination of a device, wherein the device includes a motion sensor, the method comprising:
 controlling a backlight to illuminate a display panel of the device;
 storing a first preset time interval for reducing brightness of the backlight;
 determining that an input has not been received within the first preset time interval;
 acquiring one or more signals from a sensor device corresponding to movement of the device;
 estimating whether the device is in use based on a shape of a distribution of one or more features of a multi-dimensional feature extraction function calculated from the one or more signals;
 determining that the device is not in use in response to determining that the shape of the distribution of the one of more features of the multi-dimensional feature extraction function corresponds to a Gaussian distribution;
 postponing a reduction in the brightness of the backlight based when a result of the estimate indicates that the device is in use;
 and reducing the brightness of the backlight after the first preset time interval when the multi-dimensional feature extraction function calculated from the one or more signals indicates that the device is not in use.

* * * * *